United States Patent [19]

Lerner

[11] 4,229,386

[45] Oct. 21, 1980

[54] MASS OR HEAT TRANSFER OR SEPARATION OF SOLID OR IMMISCIBLE COMPONENTS FROM FLUIDS

[76] Inventor: Bernard J. Lerner, 727 Orchard Hill Dr., Pittsburgh, Pa. 15238

[21] Appl. No.: 711,525

[22] Filed: Aug. 4, 1976

Related U.S. Application Data

[63] Continuation-in-part of Ser. No. 480,702, Jun. 19, 1974, abandoned.

[51] Int. Cl.$^3$ .............................................. B01F 3/04
[52] U.S. Cl. ....................................... 261/98; 55/259; 55/477; 210/150; 261/DIG. 72
[58] Field of Search ..................................... 261/94–98, 261/92, 36 R, DIG. 26, DIG. 72, 123; 55/97, 257 R, 259, 477, 526–528, 512; 210/150, 17, 66, 151, 500 R; 202/267, 158; 428/7–10, 18–20

[56] References Cited

U.S. PATENT DOCUMENTS

| | | | |
|---|---|---|---|
| 3,135,592 | 6/1964 | Fairs et al. | 261/DIG. 72 |
| 3,243,170 | 3/1966 | Ellis et al. | 261/DIG. 72 |
| 3,574,102 | 4/1971 | Hermanson | 428/20 X |
| 3,700,590 | 10/1972 | Burton | 210/150 X |
| 3,777,457 | 12/1973 | Laube | 55/259 X |
| 3,851,026 | 11/1974 | Heskett et al. | 261/DIG. 72 |
| 3,882,027 | 5/1975 | Lunt | 261/DIG. 72 |
| 3,885,929 | 5/1975 | Lyon et al. | 55/259 X |
| 3,956,128 | 5/1976 | Turner | 210/150 |
| 3,957,931 | 5/1976 | Ellis et al. | 210/150 X |

FOREIGN PATENT DOCUMENTS

| | | | |
|---|---|---|---|
| 2518484 | 1/1976 | Fed. Rep. of Germany | 261/DIG. 72 |
| 2275244 | 1/1976 | France | 261/DIG. 72 |
| 51-14175 | 2/1976 | Japan | 261/DIG. 72 |

OTHER PUBLICATIONS

Beco Engineering Co., "Brush-Pack ESP," Bulletin B-4, received Jan. 29, 1976.
Journal of Forestry, Nov. 1965, vol. 63, No. 11, p. 863.

Primary Examiner—Richard L. Chiesa
Attorney, Agent, or Firm—Hymen Diamond

[57] ABSTRACT

A packed column comprising a bed of bodies of fibrous material for the interphase transfer of mass and/or heat and the separation of solids or immiscible phases from fluids. Each body is of generally cylindrical form and includes a centrally disposed axial support from which a large number of fibers extend radially, the fibers being secured to the support. The bodies are disposed in the bed at random and interlocked with each other. The density of the fibers in count per unit volume varies from point to point in the packing body and in the bed. The volume of each body is small compared to the volume of the bed. In mass and/or heat transfer with this bed a liquid is distributed over the top of the bed and trickles downwardly through the packing in a multitude of irregular paths while the gas is projected upwardly through the bed. The gas contacts the liquid over a very large surface area for an extended time interval and effective mass and/or heat transfer between the gas and liquid takes place. In the separation of solids or an immiscible phase from a fluid, the fluid is transmitted once or repeatedly through the bed and the fibrous packing acts to agglomerate or coalesce the solid or immiscible phase components and deposit these components on the fibrous surface.

18 Claims, 13 Drawing Figures

MASS OR HEAT TRANSFER OR SEPARATION OF SOLID OR IMMISCIBLE COMPONENTS FROM FLUIDS

REFERENCE TO RELATED APPLICATIONS

This application is a continuation in part of Application Ser. No. 480,702 filed June 19, 1974 to Bernard J. Lerner and now abandoned published under the Trial Voluntary Protest Program on Jan. 27, 1976 as document No. B480,702.

BACKGROUND OF THE INVENTION

This invention relates to the separation of undesired components from a fluid by contacting the fluid with a medium which effects interphase mass and/or heat transfer and the separation of solid or immiscible phase components from the fluid. This invention has particular relationship to such removal by mass and/or heat transfer taking place between counter-flowing fluids through packing or by transmission of the fluids directly through packing.

Mass-transfer or heat transfer operations such as gas scrubbing, distillation, liquid-liquid extraction and the like are carried out by counterflow of fluid phases such as a gas and a liquid between which the mass transfer is to take place through a medium whose purpose is to maximize the contact surface or area between the gas and liquid without blocking the gas flow altogether by so-called flooding. Flooding is defined as the limiting condition which occurs when, as gas or liquid flows are increased, the gas phase becomes discontinuous, the gas-pressure drop becomes unstable, and the bed tends to fill with liquid. A similar phenomenon occurs in liquid-liquid extraction operations in which the dispersed lighter phase can no longer ascend and coalesces to block continuous-phase flow. Common types of prior-art packing materials include such bodies as Raschig rings and Berl and Intalox saddles as disclosed in Leva U.S. Pat. No. 2,639,909. These common packings are effective as liquid dispersal surfaces, but have the disadvantage of relatively high gas flow resistance and a susceptibility to flooding at relatively low rates of gas and liquid flow. Design fluid-flow capacities of packed towers are based principally on two criteria: the flood limit and the intrinsic gas-flow resistance of the packing. (B. J. Lerner and C. S. Grove, Jr., Industrial and Engineering Chemistry, Vol. 43, pages 216–225, Jan. 1951.) A consequent disadvantage of such conventional packings in the smaller sizes is the need for uneconomically large tower-shell diameter required to keep the gas velocity below the flooding point or to keep gas-flow resistance and dependent blower costs within economic limits.

In recent years, commercial packed-tower design practice has been directed toward obtaining higher gas velocities, or low gas flow resistance, and thus more economic smaller tower-shell diameters. Typical of the teachings of the prior-art attempts to meet this objective are:

Kleinschmidt U.S. Pat. No. 2,143,016
Smucker U.S. Pat. No. 2,607,714
Dixon U.S. Pat. No. 2,615,832
Teller U.S. Pat. No. 2,867,425
Keeping U.S. Pat. No. 2,921,776
Robjohns U.S. Pat. No. 3,293,174
Lerner U.S. Pat. No. 3,410,057
Lipinski U.S. Pat. No. 3,438,614

These patents disclose beds of randomly disposed packing materials for extending the surface contact between the phases taking part in the mass transfer. Lower gas-flow resistances and higher gas-flow velocities have been achieved through the use of larger sizes of conventional tower packings such as saddles, and the use of more "open" distributed-surface packings such as Pall rings and Tellerettes (Teller), which flood at much higher liquid and gas flow rates than do the older types of packings. However, in the use of mass and heat transfer columns including packing of this prior-art type there has been experienced the emission of liquid spray in large quantities from the top of the columns which militates against transfer efficiency.

It is an object of this invention to provide high-capacity, high-efficiency mass-transfer packed columns or beds or towers which shall transmit the gas at relatively high velocities, without excessive gas flow resistance, shall not flood until the liquid and gas-flow rates reach relatively high magnitudes, and shall not emit spray in large quantities from the top of the columns. It is also an object of this invention to provide a packed bed or column for effectively separating suspended solids or an immiscible dispersed phase from fluids, for example, turbidity from drinking water, mist droplets from gas or oil droplets from an aqueous liquid which has been exposed to oil.

SUMMARY OF THE INVENTION

It has been discovered from tests of the prior-art high-flow-rated beds of high-flood-point packing structures that, when they serve for mass or heat transfer between counterflowing fluids, they develop a mode of failure not encountered before, ahead of the flood point. As gas or liquid flow is increased, beds of these packings fail first not by flooding, but by severe spray or entrainment carryover. Spray carryover is the transfer of the liquid in droplets to the gas and the concurrent movement of these droplets by the gas. In most cases, spray or entrainment carryover with the gas-and-liquid system begins in these packings at approximately 4 to 6 feet per second superficial gas velocity (based on free tower cross-sectional area; i.e., disregarding the volume occupied by the packing) and at nominal liquid irrigation rates, and in the absence of an efficient mist eliminator above the bed, reaches inoperable carryover rates at about 6–8 feet per second superficial gas velocities.

At gas velocities greater than 4 to 6 feet per second for gas densities similar to air at standard atmospheric conditions, liquid tends to be stripped off an extended planar surface in drop form by gas friction. The size of liquid drops that can be supported in an upward-flowing gas stream can be calculated by Stokes' law; in general, the finer droplets are supported at the low gas velocities, while larger and heavier drops are entrained at the higher gas velocities. Thus, it has been discovered that in addition to the spray from the top of the bed or column observed with high-velocity conventional packings, which amounts to a substantial fraction of the liquid input at gas velocities in excess of 5 to 6 feet per second, there is also the same high degree of back-spray within the internal voids of the packing. This internal recirculation of liquid within a packed bed employed for countercurrent gas-liquid contacting causes departure from true countercurrent flow, impairs the transfer efficiency, and is highly undesirable.

It is an object of this invention to eliminate or suppress this effect and to provide a packing which, by reason of its general intrinsic structure, behaves as an efficient mist eliminator, has effective liquid-dispersal properties and yet presents to the gas a minimum of extended planar surfaces from which the liquid can be entrained.

It has been realized in arriving at this invention that what is desirable is packing whose density varies from point to point in the bed so as to achieve effective radial dispersion of the liquid. The prior-art packing does not effectively meet this condition.

Wire mesh packings, such as those disclosed by Dixon and Keeping, have uniform capillary properties, and behave like solid-wall packings when wet. Not only is liquid readily re-entrained from these packings, but these packings are not liquid-dispersing and they do not serve as efficient mist eliminators. Non-capillary fibrous-pellet packings such as those of Lerner have desirable properties; they are efficient internal mist eliminators. However, the low and fairly uniform spatial density of fibers giving the necessary non-capillarity yields low liquid retention and causes the liquid at times to channel directly through the packing, so that these packings have low mass-transfer characteristics. Similarly, fiberglass mats, such as those described in Kleinschmidt, suffer from liquid channeling behavior, and are essentially non-dispersive for liquids, giving inferior counter-current-contact transfer performance as compared to planar packings.

In accordance with this invention, a new type of packing is provided which has been found to have unique liquid-dispersion properties for effecting gas-liquid contact, and which allows high gas-velocity-low-pressure-drop operation while providing for internal mist elimination. It has also been discovered that this new type of packing has the unique ability to effectively separate components, for example, particles or immiscible (e.g., oil in water) droplets from fluids flowing through the packing. This invention is an inter-phase mass-transfer or heat-transfer or separation column or tower operating either by counter-flow of a gas and liquid or direct single-fluid passage, having a bed of fibrous bodies or packing elements formed of a multitude of fibers extending radially from a central axial support to which the fibers are secured. The dimension of the bodies is small relative to the dimension of the column. Typically, the bodies are regularly shaped, for example, of circularly cylindrical form with the height substantially equal to the diameter. The minimum dimension of the column is typically eight to ten times the diameter of a packing body and the minimum depth of the bed about three times the diameter of the packing body. Typical columns may have a diameter as small as one foot and as large as twenty-five feet. The diameter of a packing body should be so related to the density of the radial fibers extending from the axial support that the density of the fibers, in counts per unit volume, at the periphery of the body is about one-half or less the density near the axis of the body.

This invention achieves an important desideration, namely a non-uniform distribution or density of the fibers, in counts per unit volume from region to region throughout the bed. While this desideration is achieved in a unique and highly advantageous manner with the radial bodies or elements, other modes of achieving this desideration are within the scope of this invention.

In the practice of this invention, the bodies or elements are randomly disposed in the column with their fibers interlocked. The diameter and/or height of the packing body is large compared to the diameter of the fibers. Typically, the packing body diameter and height are 2 to 4 inches and the diameter of a fiber is 0.010 to 0.020 inch. The fibers should be sufficiently strong to resist substantial deformation under the loads impressed on the fibers during mass-transfer operation.

A random bed of fibrous bodies in accordance with this invention forms an interlocking three-dimensional extended-surface packing with a marked degree of non-uniform spatial density, yielding excellent liquid-dispersion properties, low gas-flow resistance, excellent mist and particulate separation characteristics and unique mass-transfer properties. The packing body is very light in weight and can be made from low-cost, corrosion-resistant materials. It is characterized by very high gross void space and very low pressure drops even at high rates of gas and/or liquid flow. It is highly resistant to both flooding and to internal and external spray carryover.

A unique feature of the packing in accordance with this invention is the variable spatial fiber density of the element, which imparts outstanding advantages over prior-art mesh or fiber packing elements. In counter-current gas-liquid contacting the relatively high density of fibers in the axial region around the stem or core of the element causes any impinging liquid stream to be intercepted, deflected, dispersed and spread out, generally in the form of multiple smaller liquid streams or droplets directed radially away from the stem along the fibers. This spreading action is independent of the orientation of the element in the bed, so that the bed is not only highly resistant to liquid channeling, but achieves a unique degree of radial dispersion and re-dispersion of the liquid.

Depending on the nature of the liquid-gas-contacting operation, it may be desirable to utilize filaments that are either non-wettable or wettable by the liquid phase. For example, in certain operations, where diffusion resistance within the liquid phase controls of mass transfer and liquid mixing is desirable or essential, it is preferable to utilize non-wetting fibers so that liquid drops roll along the fibers. The rolling of the drops has a stirring action which enhances the diffusion of the transferred matter on the surface of the drops throughout the drops. Alternately, in certain cases of absorption or desorption of a gas component to or from the liquid phase (where gas diffusion controls) it may be desirable to use fibers that are wettable by the liquid, so that the liquid is transferred along the fiber surfaces as a continuous high-surface-area thin film. In both cases, non-wettable and wettable fibers, the radial transfer mechanism serves to transfer liquid from the stem region to the outer low-fiber-density region of the element where the gas predominately tends to flow because of the lower flow resistance. Thus, the unique liquid dispersion mechanism serves to continuously transfer liquid from regions where it would be relatively shielded from bulk-gas-flow contact to regions where the major portion of the gas tends to flow. Further, a portion of the fibrous element interlocks with the peripheral fibers of its neighbors, thus allowing the transfer of liquid from body to body directly along the interlocking fibers. Liquid that does not transfer along interlocking fibers, "dead-ends" at the end of the fiber, forms drops which then fall through the interstitial void space, thus contributing to liquid mixing and redistribution. In the prior-art solid or mesh-surface packings, the free-fall distance of such drops is relatively long, of the order or magnitude of one or more packing diameters, and relatively little mass transfer takes place during this free-fall distance because of the tendency to surface stagnation of small drops. In the fibrous-body bed according to this invention, the free-fall drop distance is a small fraction of the packing diameter because the fibers occupy most of the volume of the bed and fiber-to-fiber distances are small. Further, the fibrous packing has a uniquely, very large number of fiber ends at which free-fall drops are generated. Gas mixing, which is secured in a prior-art packed bed composed of planar solid bodies by turbulent flow through non-uniform free void volume, is obtained in the case of the radial fiber-element bed according to this invention by gas flow through volumes of varying fiber count or volume density. The high-density regions are formed not only within the elements themselves at the core region, but also by the regions between elements where fibers are interlocked. This latter effect may become excessive in certain fiber and element size ranges, and it is desirable in such cases to utilize crimped fibers to control the degree of element interlocking and the compaction.

The packing according to this invention has additional remarkable properties. This packing suppresses wall flow of the liquid; that is, flow along the walls of the tower, which occurs with conventional packings. A wiping action has been observed, in the practice of this invention, by the multitude of fibers which engage the tower walls. The liquid which reaches the walls typically from traverse along fibers sloped downwardly towards the wall, is subsequently picked up by fibers sloped downwardly away from the wall and returned to the packing.

Another feature is the internal entrainment elimination property of this packing. When the fibers are wetted by the liquid, any tendency to strip droplets at high gas velocity is compensated by the intrinsic droplet-capture capability of the adjacent fibers. Since the point-to-point density of the fibers varies, the stripping occurs in regions of low fiber count density and high point gas velocity. However, the gas must then pass through regions of high fiber count density and/or low point gas velocity where the entrained droplets are removed.

It has also been discovered that in addition to the effective separation of mist droplets from a gas, which this bed of random bodies with their fibers interlocked manifests, the bed according to this invention is remarkably effective in the separation of undesired components from fluids and particularly in the separation of particles or oil droplets from liquids. Separation tests and microscopic examination of the fibers have shown that the mechanisms by which this separation occurs are other than those involved in conventional filtration or simple impingement removal of particles or oil droplets from a fluid.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENT

Figure 1:
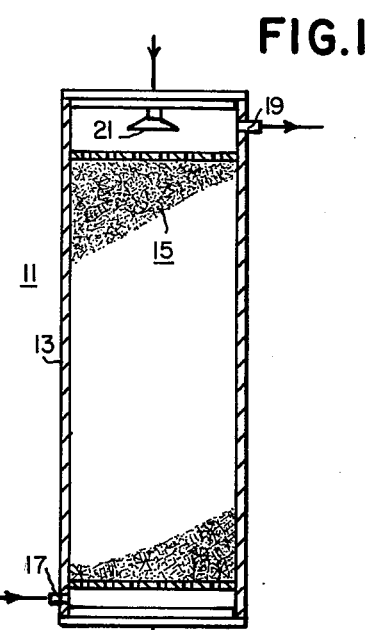
FIG. 1 is a view in section showing a mass-transfer column or tower in accordance with this invention.

The apparatus shown in FIG. 1 is a column 11 for carrying out a mass-transfer operation typically between a contaminated gas and a liquid to purify the gas. This column 11 includes a shell 13 within which there is a bed 15 for effecting the mass transfer of the contaminant from the gas to the liquid. Near the base of the column there is an inlet 17 for the contaminated gas and near the top of the column 11 there is an outlet 19 for the decontaminated gas. At the top of the column 11 above the bed 15 there is a spray 21 for distributing the liquid wash over the upper surface of the bed 15. The liquid wash which has absorbed the contaminant may be discarded or returned to the spray 21 through a filter 23 by a pump 25.

Figure 5:
FIG. 5 is a fragmental view in side elevation of a fiber of the bodies shown in FIGS. 3 and 4.
Figure 3:
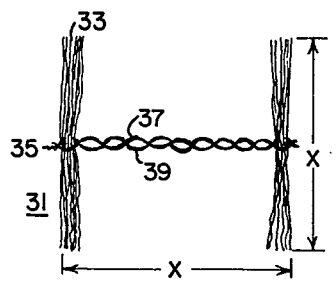
FIGS. 3 and 4 are views in side elevation with the fibers omitted from the center showing typical packing bodies or elements used in the practice of this invention.
Figure 4:
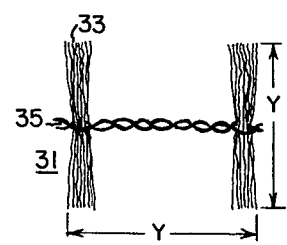

The bed 15 is composed of a plurality of cylindrical bodies or elements 31 randomly disposed within the bed and interlocked with each other. Each body 31 includes a large number of fibers 33 extending from an axial support 35. The bodies are formed by juxtaposing a pair of wires 37 and 39 parallel to each other, inserting the inner ends of the fibers 33 between the wires 37 and 39 and twisting the wires into interlaced helices so that they clamp the inner ends of the fibers 33. The fibers 33 may be composed of metal, for example, stainless steel, or of plastic such as polypropylene, polyester, polystyrene, polyvinylchloride, or fiber glass. The fibers should be crimped as shown in FIG. 5. FIGS. 3 and 4 show bodies of typical dimensions. In FIG. 3, x=3½ inches and in FIG. 4, y=2½ inches.

A typical body 31 of 3½" diameter and height has 1826 fibers 33 extending from an axial support 35 having helices with 16 turns. Each fiber has a diameter of 0.010 inch. The surface area of the fibers on one body 33 is about 200 square inches. There are about 100 brushes per cubic foot of bed 15 or 140 square feet of fiber contact surface per cubic foot of bed.

The 2½" diameter body has 909 fibers of 0.010 diameter each per body. These fibers have a surface area of 71.5 square inches per body. There are about 250 bodies per cubic foot of bed and this provides about 125 square feet of fiber contact area per cubic foot of bed.

Figure 6:
FIG. 6 is a fragmental view in side elevation showing the manner in which a non-wettable fiber carries the liquid in the practice of this invention.
Figure 7:
FIG. 7 is a fragmental view in side elevation showing the manner in which a wettable fiber carries the liquid in the practice of this invention.

The fibers 33 may be non-wettable or wettable by the liquid 41. If the fibers are non-wettable, the liquid forms into drops 43 which roll under gravity along the fiber 33a (FIG. 6). If the fibers are wettable, the liquid flows in a stream 45 along the fiber 33b (FIG. 7).

The bodies 31 are disposed at random in the bed 15 with their fibers 33 interlocked. Typically the density of fibers 33 in number or count per unit volume at the axis of a body 31 is about twice the density at the periphery. The density of fibers throughout the bed other than at the axes of the bodies 31 depends on the extent to which and the manner in which the fibers 33 are interlocked. The microscopic density of fibers from point to point throughout the bed 15 is then highly variable. The spray 41 (FIG. 2) falling on a region of the bed 15 where the density of fibers is high as near the axis 35 of a body 31 (FIG. 2) is predominately deflected from this region to other parts of the bed, as shown by the arrows 51 in FIG. 2, and the liquid trickles through the bed in irregular paths effectively decontaminating the gas flowing in the opposite direction.

Figure 8:
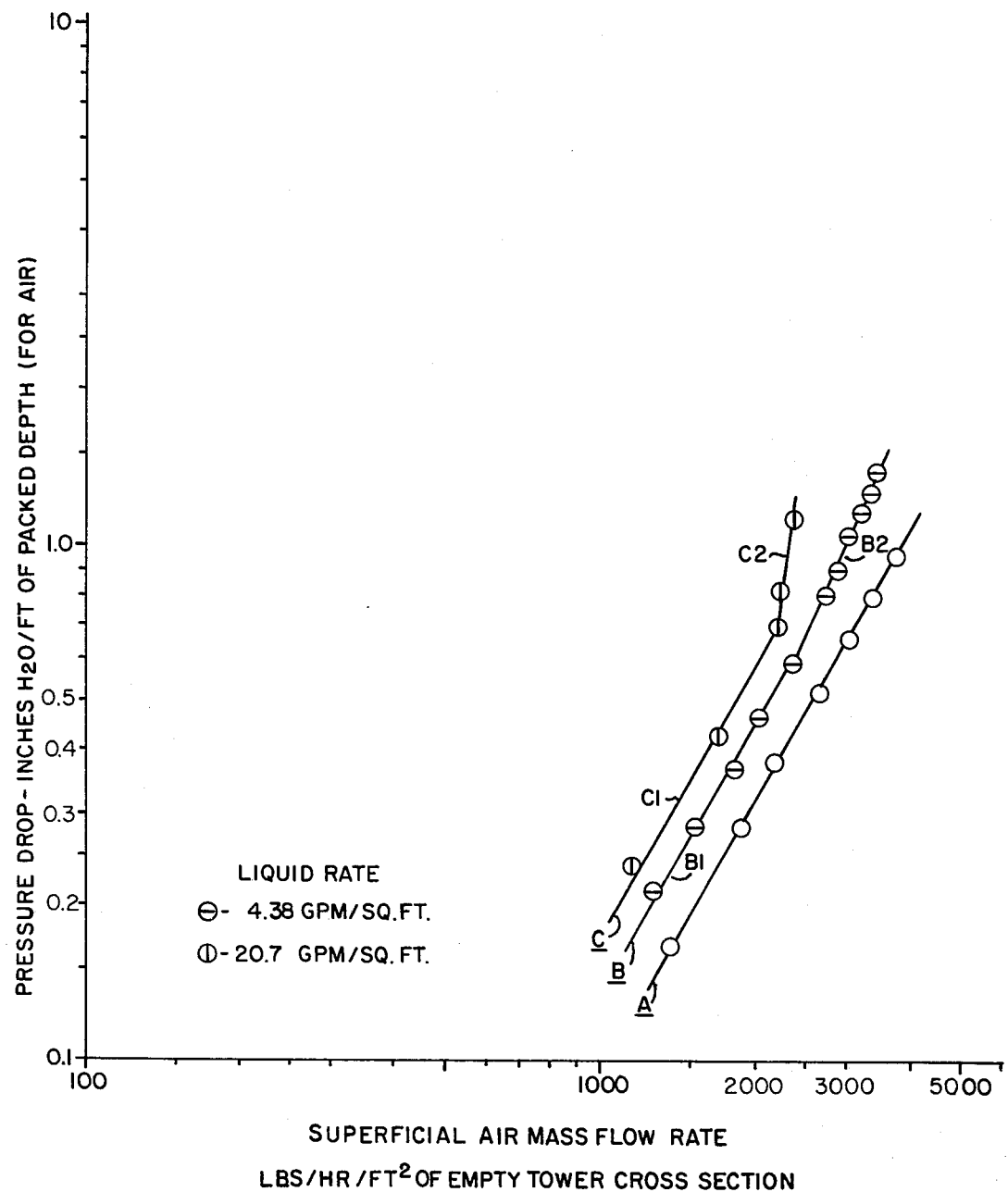
FIG. 8 is a graph illustrating the operation of this invention.

FIG. 8 is a graph showing the relationship between an air mass flow through a bed in accordance with this invention and the pressure drop of the air. The packing elements used are of the type shown in FIG. 4 having a diameter and height of 2½ inches. Air mass flow rate in pounds per hour per square foot of cross section of the tower, disregarding the part of the cross section taken up by the volume of packing, is plotted horizontally and pressure drop in inches of water per foot is plotted vertically. Both coordinates are logarithmic. Curve A is the plot for dry packing with no water spray; Curve B is the plot for water spray at the rate of 4.38 gallons per minute per square foot; Curve C is the plot for water spray at the rate of 20.7 gallons per minute per square foot. Curve A is linear having a slope of about the 1.8 to 2.0; the pressure drop increases at the rate of about the 1.8 to 2.0 power of the increase in air flow rate. Curve B has a branch B1 parallel to A; the pressure drop for each flow rate for B1 is substantially higher than for A. For example, at 2000 lbs/Hr/Ft.$^2$ the pressure drop for A is 0.32 inches of water while for B1 it is 0.45 inches of water. Curve B has another branch B2 which has a higher slope than A or B1. The break point or loading point between the branches B1 and B2 is at flow rate 2300 lbs/Hr./Ft.$^2$ at a pressure drop of 0.60 inches of water. Curve C likewise has two branches C1 and C2, C1 being parallel to A and B1, but at higher pressure drop at any flow rate. The loading point in this case is at flow rate 2400 lbs/Hr./Ft.$^2$ pressure drop 0.68 inches of water. The loading point in each case is the point at which the slope of the curve increases above the usual 1.8 to 2.0 slope.

Curves B and C show that at any gas-flow rate the pressure drop is higher than for the dry tower. This signifies that the water is being effectively held up by the packing 33 in the bed 31.

The displacement of curves B and C from the dry line A shows that the water (liquid) is not being substantially channeled through the bed 31. There would be no substantial displacement between the curves if the liquid were channeled. The lower loading points for curve C than for Curve B; i.e., lower loading point for increased liquid flow-rate, also shows the absence of substantial channeling.

It has also been found that so effective is the packing that if the liquid is impinged as a single stream rather than a spray, it is distributed throughout the bed within a few packing-body diameters of downward travel and does not channel.

Figure 2:
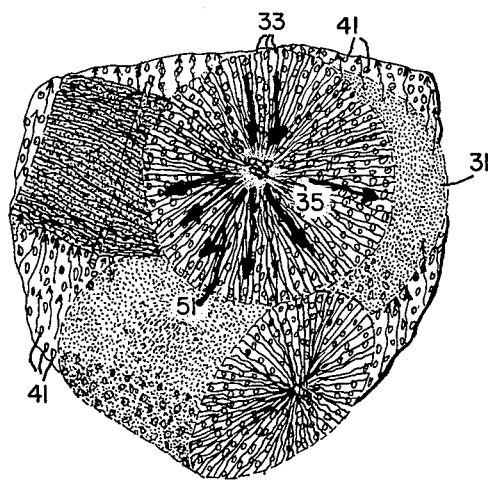
FIG. 2 is a fragmental view enlarged of a small portion of the bed of the apparatus shown in FIG. 1.
Figure 9:
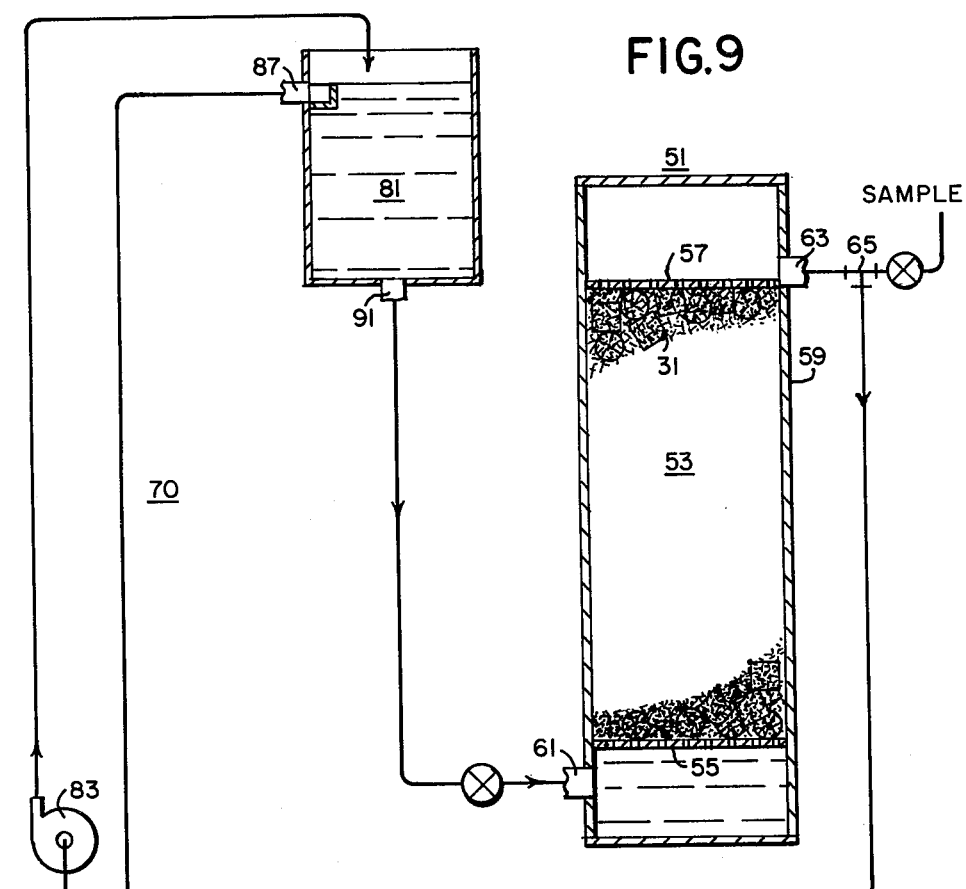
FIG. 9 is a diagrammatic view of apparatus used in verifying the discovery that the bed according to this invention is effective in the removal of undesired components from fluids.

FIG. 9 shows a column 52 similar to the column 11 shown in FIG. 1. This column 52 includes a bed 53 of randomly disposed bodies 31 with their fibers 33 interlocked as shown in FIG. 2. The bodies 31 are supported between screens 55 and 57 suspended from the wall 59 of the column. The column 52 has an inlet 61 for fluid which is passed through the bed 53 and an outlet 63 for fluid which has passed through the bed. The outlet 63 has a tap 65 for recirculating fluid through the bed 53.

FIG. 9 also shows apparatus 70 for testing the efficacy of the bed 53 in removing undesired components from a fluid. This apparatus includes a reservoir 71 having a stirrer 73 driven by a motor 75. The fluid 77 whose component is to be separated is within the reservoir 71. For test purposes the fluid 77 in one case was a slurry of fly ash in water; in another case it was oil in water. The testing apparatus 70 also includes a tank 81 to which the slurry from reservoir 75 is supplied by a pump 83. The slurry conductor 85 to the pump 83 supplies the slurry from the lower portion of the reservoir 71. The tank 81 is a constant-head tank having an overflow outlet 87 which recirculates slurry that rises to the outlet to the reservoir 71. The tank 81 has an outlet 91 in its base which is connected to the inlet 61. The tap 65 is connected to reservoir 71 recirculating treated slurry to the reservoir. The studies were conducted on the removal of fly ash from the water slurry 77 in a 7.5-inch diameter vertical column 51 of acrylic which contains a bed 53 of 30 cylindrical bodies 31 in the form of brushes, random-packed and interlocked on the grid support 55 to a depth of about 16 inches, each brush being cylindrical, 3¼" in diameter and 3¼" in brush length. Various brush-filament or fiber material 33, including polypropylene, polyester and nylon, were tested in separate runs.

A batch of approximately 8 gallons of slurry was prepared by mixing 100 grams of fly ash with water to give a concentration of approximately 3.3 grams/liter. This suspension was recycled from reservoir 71 to the constant-head overflow tank 81 by the centrifugal pump 83 at approximately 18 lbs./min., a rate sufficient to maintain the solids in suspension. The flow to the test column was maintained constant at 11.2 lbs./min. by gravity feed from the constant-head tank 81, and flow through the test bed 53 in all cases was upflow, to avoid the effects of conventional impingement filtration. Liquor overflowed from the top of the bed 53 through the pipe connection 63 and back to the reservoir 71. Samples were taken periodically from the connection 63, monitoring the solids content as a function of time. One liter samples were taken, and the solids were filtered out with filter paper and dried to constant weight in an oven. In addition, microscopic examination of the fibers 33 were made as a function of time in separate runs. Blank or comparison runs were made under identical conditions, but without any packing in the tower.

Microscopic examination of the nature of particle collection on the packing elements 33 as a function of time showed that two mechanisms were operative. For the initial period of operation, from 0 to 60 minutes, it was observed that, surprisingly, a uniform deposition of the smaller single particles, of dimensions in the range of 1 to 20 microns, was obtained on the filament surfaces. Remarkably, the collection of these single particles appeared to be entirely independent of the flow direction and the spatial orientation of the fibers 33 in the bed 53. The fibers 33 collected approximately equal numbers of small particles per unit area throughout the area of the fibers, a phenomenon greatly different from conventional filtration in which the surfaces facing the flow would have received the greatest quantity of solids. These observations were made on all of the plastic filaments tested, and all behaved similarly. Along with the uniform collection phenomenon, and becoming more pronounced with time onstream, a second type or mechanism of collection was observed. This was the deposition primarily on the upper surfaces (downstream side) of the fibers 33 of particle agglomerates and aggregates greater than 20 microns in diameter. Because the agglomerate collection was primarily on the upper surfaces of the filaments and despite the counter-flowing water, this was simple gravity collection of sedimentation. In order to determine whether the random-bed of brush-like fibers 33 enhanced the deposition, agglomeration and gravity collection of the particulates, concentration vs. percolation time data were plotted for blank runs and for the packed-bed runs. These data are presented in the following Table 1 and plotted in FIGS. 10 and 11.

TABLE I

FLY ASH CONCENTRATION IN GRAMS/LITER AS A FUNCTION OF CIRCULATION TIME

| Conc. Time | #2 Blank | Poly- Propylene (30 Brushes) 27.81 Sq. Ft. | Poly- ester (30 Brushes) 44.53 Sq. Ft. | (30 Brushes) "X" Shaped Poly- ester 50.17 Sq. Ft. | Nylon (30 Brushes) 37.51 Sq. Ft. |
|---|---|---|---|---|---|
| 15 min. | 1.336 | 0.528 | 0.780 | 0.624 | 0.784 |
| 1 hour | 0.880 | 0.292 | 0.292 | 0.144 | 0.312 |
| 2 hours | 0.760 | 0.156 | 0.116 | 0.052 | 0.152 |
| 3 hours | 0.632 | 0.068 | 0.044 | 0.008 | 0.076 |
| 4 hours | 0.412 | 0.028 | 0.032 | 0.016 | 0.052 |
| 5 hours | 0.440 | 0.012 | 0.008 | 0.044 | −0.004 |
| 6 hours | 0.376 | 0.012 | 0.016 | 0.024 | 0.060 |
| 7 hours | 0.312 | 0.004 | 0.100 | — | 0.048 |

Figure 11:
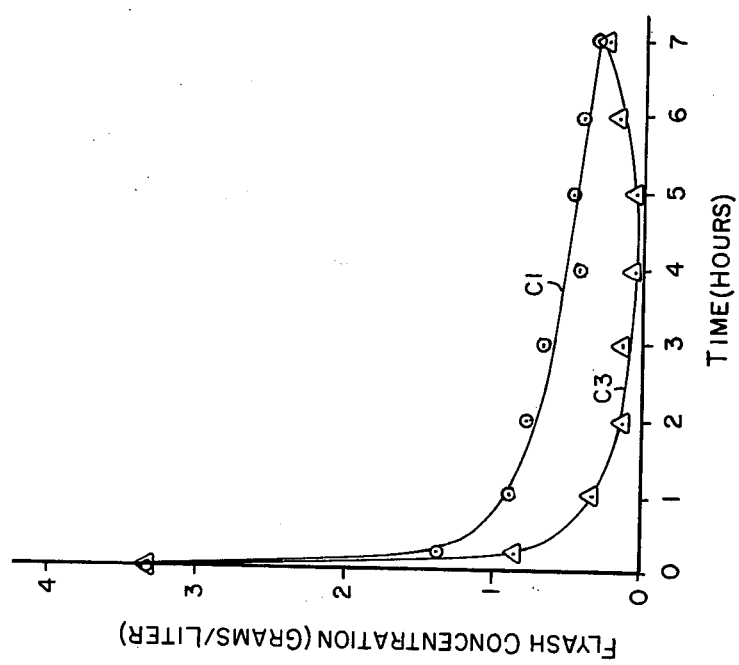
FIGS. 10 and 11 are graphs based on data derived with the apparatus shown in FIG. 9 which illustrate verification of the discovery.
Figure 10:
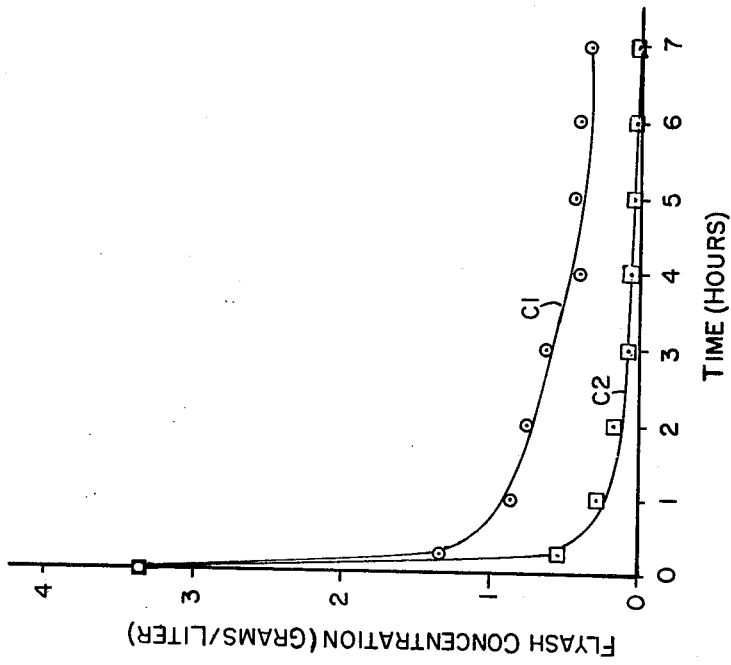

In each FIGS. 10 and 11 fly-ash concentration, in grams per liter in the liquid derived from outlet 63 (treated liquid) is plotted vertically and time in hours horizontally. The upper curves C1 in both FIGS. 10 and 11, which plots the same data, was plotted for operation without packing. The lower curves C2 and C3 in each FIGS. 10 and 11 where plotted for polypropylene packing and polyester packing 53 respectively. As shown by comparing curves C1 and C2 with a random-packed bed of the brush-like interlocked elements 31, with a fill of 14-mil polypropylene fibers 33, and with a total surface of 27.8 square feet of fiber of filament and, the concentration of fly ash solids suspended in the water was reduced in one hour of recycling through the bed 53 of this invention to less than 35% of the concentration of solids in the blank run at the same time, and at 3 hours to less than 11% of the concentration in the blank run at the same time, and at 4 hours to 6.8% of the solids content of the blank at the same time, and at 5 hours to 3.2% of the blank at that time. For the run with the polyester fiber brushes, with a random bed 53 of interlocked brushes 31 whose fibers 33 have a total area of 44.5 square feet, the same general accelerated solids separation was achieved as shown by comparing curves C1 and C3. However, after reaching a solids concentration of 0.008 grams/liter at the 5-hour point, as compared to a solids concentration of 0.440 grams/liter in the blank at 5 hours (or 1.8%), the polyester showed an increase in solids concentration at the 6 and 7-hour points, indicating that the solids were being removed or sloughing off the filaments during this period.

Figure 12:
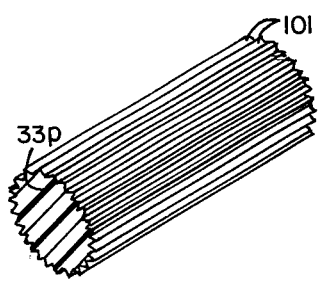
FIG. 12 is a fragmental view enlarged in side elevation of a polypropylene fiber of the packing bodies forming a bed in accordance with this invention.
Figure 13:
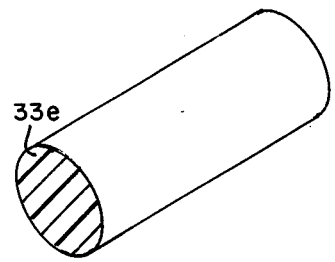
FIG. 13 is a fragmental view enlarged in said elevation of a polyester fiber of the packing bodies forming a bed in accordance with this invention.

The polypropylene fibers 33p are shown enlarged in FIG. 12 and the polyester fibers 33e are shown enlarged in FIG. 13. The fibers 33e of polyester are seen to be smooth, whereas the fibers 33p of polypropylene have microgrooves 101 running the length of the fibers 33p. Examination of the nature of the initial uniform deposit of particles on the two kinds of fibers 33p and 33e indicates that the microgrooves on the polypropylene fibers 33p provides a rough or highly-stable base layers of particles. On the other hand, the smooth polyester surface does not provide a strongly-attached basic deposit, and apparently, when the solids accumulated to a sufficient depth, the deposit became unstable, and part of the fly ash slides off. A polyester having an X-cross section shape was tested, and as shown in Table 1, this material does not show the shedding effect.

The curves C1 show a decay of the concentration of fly ash because the fly ash settles out of the liquid in the column. However, as seen from curves C1, the settling-out effect levels off and a substantial concentration of fly ash remains in the liquid.

A mixture of oil and water was also tested. The circulation of the liquid was the same except that, because oil tends to rise to the surface of water, the input from tank 81 to the column 51 was supplied near the center of the bed 53 and the recirculation to the reservoir 71 was from the bottom of the column 51. The liquid for testing was removed from the bottom of bed 53 and was extracted with toluene. The toluene was evaporated and the remaining oil weighed. A mixture of a pint of mineral oil in 3 gallons of water was tested. Liter samples of the mixture from column 51 without and with packing 53 at equivalent operating times were tested. In each case the oil was extracted from the water sample with toluene, the toluene evaporated and the remaining oil weighed. Without packing, there was 300 milligrams of oil per liter of sample; with packing the quantity of oil could not be weighed.

The tests show that the mechanisms of particulate removal by the random bed structures of this invention differ from those of conventional filtration, and that the relative efficiency of the bed is strikingly high compared to straight-forward settling or sedimentation shown by the blank run. Further, the tests show that the mechanisms that are effective for solid particulate removal by the bed 53 of this invention are equally applicable to other particulate fluid systems as liquid-liquid dispersions and the like. Examples of the latter are coalescence and oil-water separation.

In comparing the ability of a bed of this invention to separate particulate matter from water, tests were conducted at the Weymouth Filtration Plant of the Los Angeles Metropolitan Water District at LaVerne, Calif. Two parallel filter columns were set up. Each column contained a dual-media filter through which drinking water was processed, the filter being comprised of 20" of crushed anthracite coal supported by an 8" depth of filter sand. The feed to the columns was raw water, identical to the water going to the normal sand filters. One of the two parallel columns contained, in addition to the dual-media filter, 12" of the fibrous-body packing in accordance with this invention and described above in the fly-ash separation tests (FIG. 9). Raw water was passed through the parallel columns and the pressure drop across the dual-media filter and the turbidity of the processed water was measured as a function of time. The turbidity, as measured in Jackson Turbidity Units, of the effluent water from the column containing the fibrous-body bed was equal or better in quality than from the column not containing this bed, at all time intervals. A laser-beam analysis of the particle size of the residual suspended matter contained in the treated water from each filter column showed that the water from the fibrous-body bed column contained less particulate matter of all particle size ranges than did the water from the dual-media only column. In fact, the water derived from the filter column containing the bed in accordance with this invention was equal or superior to distilled water in purity.

While preferred embodiments of this invention have been disclosed herein, many modifications thereof are feasible. This invention is not to be restricted except insofar as is necessitated by the spirit of the prior art.

I claim:

1. A packed column for mass and/or heat transfer between a gas and a liquid flowing counter-current to each other, said column comprising a bed of fibrous bodies, disposed at random in said column, the fibers of each of contiguous of said bodies being interlocked with the fibers of other of said bodies contiguous to it, each of said bodies having an axial support from which a plurality of said fibers, secured to said support, extend radially, whereby the number of fibers per unit volume of said column varies spatially in all directions from point-to-point of said bed throughout said bed, whereby the liquid is dispersed by the region of the bed where the number of fibers per unit volume is high and flows along the fibers from fiber to fiber where the fibers interlock.

2. In a column for mass and/or heat transfer by counterflow of a liquid and gas, a plurality of bodies forming a bed, each body having an axial support from which a large number of bristles extend radially, said bodies being disposed at random with reference to each other with the bristles of each of contiguous of said bodies interlocked with the fibers of other of said bodies contiguous to it, whereby the number of bristles per unit volume of said column varies spatially in all directions from point-to-point of said bed throughout said bed, whereby the liquid is dispersed by the regions of the bed where the number of fibers per unit volume is high and flows along the fibers from fiber to fiber where the fibers interlock.

3. A mist eliminator for removing liquid droplets from a gas stream, comprising a bed of randomly disposed bodies of fibrous material, each of said bodies having an axial support from which a plurality of fibers, secured to said support, extend radially, the number of fibers per unit volume near said support being high compared to the number of fibers per unit volume near the outer ends of the fibers remote from said support, the fibers of each of contiguous of said bodies being interlocked with the fibers of other of said bodies contiguous with it so that the spatial point-to-point density in all directions of said fibers in said bed varies throughout said bed.

4. A packed column for mass and/or heat transfer between a gas and a liquid flowing counter-current to each other comprising a bed of bodies of fibrous material, each body being of a volume which is small compared to the volume of the column, said bodies being randomly disposed in said bed each of said bodies having an axial support from which a plurality of fibers, secured to said support, extend radially, the number of fibers per unit volume near said support being high compared to the number of fibers per unit volume near the outer ends of the fibers remote from said support, the fibers of each of contiguous of said bodies being interlocked with the fibers of other of said bodies contiguous to it, whereby the liquid is dispersed by the fibers and flows along the fibers transferring from body to body along interlocking fibers and the bed is resistant to liquid channeling and achieves radial dispersion and redispersion of the liquid.

5. The packed column of claim 4 wherein each body is circularly cylindrical, the number of fibers per unit volume at the periphery of said body being about one-half the number of fibers per unit volume near the axial support of said body.

6. The packed column of claim 4 wherein the diameter of the body is large compared to the diameter of the fiber.

7. The packed column of claim 4 wherein the height of the body is large compared to the diameter of the fiber.

8. The packed column of claim 1 wherein the fibers are wettable by the liquid and the liquid flows along the fibers in a continuous stream.

9. The packed column of claim 1 wherein the fibers are non-wettable by the liquid and the liquid flows along the fibers in drops.

10. The packed column of claim 4 wherein the fibers are crimped.

11. The apparatus of claim 4 wherein each body has a volume which is small compared to the volume of the column.

12. The apparatus of claim 4, for mass and/or heat transfer between a liquid and a gas, including means for conducting through the bed a said liquid and a said gas counter-current to each other.

13. The apparatus of claim 4, for eliminating mist from a mist-laden gas, including means for conducting the mist-laden gas through the bed.

14. Apparatus for separating undesired components from fluids including a bed of bodies each body comprising an axial support from which fibers extend radially, said bodies being positioned in said bed randomly with the fibers of each of contiguous of said bodies interlocked with the fibers of others of said bodies contiguous to it and means for conducting the fluids through said bed.

15. Apparatus for separating constituents and/or transferring energy from a fluid comprising a packed column having a bed formed throughout of a plurality of bodies, each of said bodies having an axial support from which fibers extend radially, the said apparatus being characterized by that in said bed the bodies are disposed at random with reference to each other with the fibers of each of contiguous of said bodies interlocked with the fibers of others of said bodies contiguous to it, so that the number of fibers per unit volume of said bed, varies spatially in all directions from point-to-point of said bed throughout said bed.

16. The method of separating from a fluid undesired components which comprises conducting said fluid including said components through a bed of bodies, each body comprising an axial support from which bristles extend radially and said bodies being positioned in said bed randomly with the bristles of each of contiguous of said bodies interlocked with the bristles of the others of said bodies contiguous to it, dispersing and deflecting said fluid through said bed and along said bristles thus initially causing said undesired components of smaller dimensions to adhere to said bristles and deposit substantially uniformly on said bristles, by said dispersion and deflection of said fluid along said bristles also inducing agglomeration and coalescence of said undesired components to form aggregates of said undesired components, depositing said aggregates on the downstream sides of said bristles, and disposing of the resulting fluid after passing it through said bed.

17. The method of claim 16 including the steps of conducting the fluid repeatedly through the bed and collecting the resulting fluid after the content of the undesired component in said fluid is below a predetermined level.

18. Fluid treating apparatus comprising a casing having fluid entrance means and fluid exit means and having therein packing through which said fluid flows from said entrance means to said exit means, said packing including a bed of bodies, each body comprising an axial support from which fibers extend radially, said bodies being disposed in said bed randomly with the fibers of each of contiguous of said bodies interlocked with the fibers of others of said bodies contiguous to it.

* * * * *